United States Patent
Issaa et al.

(10) Patent No.: US 6,829,336 B1
(45) Date of Patent: Dec. 7, 2004

(54) SYSTEM AND METHOD FOR ACTIVE FILTERING IN A TELECOMMUNICATIONS NETWORK

(75) Inventors: Michael A. Issaa, San Bruno, CA (US); Steven Chow, San Carlos, CA (US)

(73) Assignee: Cisco Technology, Inc., San Jose, CA (US)

( * ) Notice: Subject to any disclaimer, the term of this patent is extended or adjusted under 35 U.S.C. 154(b) by 791 days.

(21) Appl. No.: 09/580,798

(22) Filed: May 30, 2000

(51) Int. Cl.[7] .............................................. H04M 11/06
(52) U.S. Cl. .................................. 379/93.05; 370/488
(58) Field of Search ......................... 379/90.01, 93.01, 379/93.05; 370/488

(56) References Cited

U.S. PATENT DOCUMENTS

| | | | |
|---|---|---|---|
| 5,623,543 A | 4/1997 | Cook | 379/402 |
| 5,757,803 A | 5/1998 | Russell et al. | 370/494 |
| 5,930,340 A * | 7/1999 | Bell | 379/90.01 |
| 6,009,148 A * | 12/1999 | Reeves | 379/396 |
| 6,188,750 B1 * | 2/2001 | Kiko | 379/90.01 |
| 6,226,322 B1 | 5/2001 | Mukherjee | 375/229 |
| 6,226,331 B1 * | 5/2001 | Gambuzza | 379/413 |
| 6,301,337 B1 * | 10/2001 | Scholtz et al. | 379/93.06 |
| 6,532,280 B1 | 3/2003 | McDonald | 379/93.05 |

OTHER PUBLICATIONS

Patton Electronics Co., Model 3010 Three Port Modem Sharing Device User Manual, Oct. 26, 1993.*
Sergio Franco, cover sheet entitled, "Design with Operational Amplifiers and Analog Integrated Circuits," "Chapter 3—Active Filters: Part I," McGraw–Hill Company, pp. 96–145.

* cited by examiner

*Primary Examiner*—Forester W. Isen
*Assistant Examiner*—Daniel Swerdlow
(74) *Attorney, Agent, or Firm*—Baker Botts L.L.P.

(57) ABSTRACT

A filtering device (50) for active filtering at a customer premises includes an input interface that receives telephone signals and digital data signals communicated from a central office (14) using a telephone line (12). The filtering device (50) further includes an active low-pass filter (60) that receives the telephone signals, the digital data signals, and electrical power from a power source. The active low-pass filter (60) attenuates the digital data signals and passes the telephone signals using the electrical power. The filtering device (50) also includes an output interface that receives the telephone signals from the active low-pass filter (60) and communicates the telephone signals to a telephone (42).

26 Claims, 3 Drawing Sheets

(12) United States Patent
US 6,829,336 B1

SYSTEM AND METHOD FOR ACTIVE FILTERING IN A TELECOMMUNICATIONS NETWORK

TECHNICAL FIELD OF THE INVENTION

This invention relates generally to the field of telecommunications, and more particularly to a system and method for active filtering in a telecommunications network.

BACKGROUND OF THE INVENTION

Many computing applications require the digital transmission of data to and from customer premises using the analog telephone system. Conventional modem technology is one such method. This technology transmits digital data over the telephone lines that connect customer premises with the local telephone company's central office or an intermediate device such as a digital loop carrier (DLC). These telephone lines are typically twisted-pair copper wire and may be referred to as the "local loop." Conventional modem technology transmits the data in analog form over the local loop using the frequency band allocated for voice transmissions. However, the frequency range of the voice band, typically below 4 kHz, limits the speed at which a given volume of the data can be transmitted.

Digital subscriber line (DSL) technology, on the other hand, can apportion the transmission of signals over telephone lines into a voice channel and a digital data channel. For example, the voice channel may include signals below 4 kHz while the digital data channel may include signals above 25 kHz. Using this digital data channel, DSL provides a method of increasing the bandwidth of the existing telephone network infrastructure. Furthermore, DSL technology allows conventional plain old telephone service (POTS) devices that use the voice channel and DSL devices using the digital data channel to communicate simultaneously over the local loop. To accomplish this task, splitters or filters may be used to separate the two channels. Typically, a splitter or filter is placed at the central office, the customer premises, or both.

One filtering technique that may be used at the customer premises is a distributed filter architecture. In a distributed filter architecture, a low-pass filter is coupled between a customer premises wiring interface (such as an RJ-11 jack) and each telephone. For example, each telephone, facsimile machine, and other conventional telephony device may be coupled to a low-pass filter which is coupled to the customer premises telephone wiring. Each low-pass filter allows signals in the voice channel to travel to and from the conventional devices, while filtering out traffic and noise associated with devices using the digital data channel.

SUMMARY OF THE INVENTION

According to the present invention, disadvantages and problems associated with previous techniques for filtering in a telecommunications network have been substantially reduced or eliminated.

According to one embodiment of the present invention, a filtering device for active filtering at a customer premises includes an input interface that receives telephone signals and digital data signals communicated from a central office using a telephone line. The filtering device further includes an active low-pass filter that receives the telephone signals, the digital data signals, and electrical power from a power source. The active low-pass filter attenuates the digital data signals and passes the telephone signals using the electrical power. The filtering device also includes an output interface that receives the telephone signals from the active low-pass filter and communicates the telephone signals to a telephone.

The system and method of the present invention provide a number of important technical advantages. The present invention provides a filtering device for use in conjunction with DSL service at a customer premises that attenuates the high frequency digital data signals associated with the DSL service and prevents them from interfering with the telephones located at the customer premises. The filtering device may help prevent disruption of telephone service due to faults in the DSL equipment, such as a DSL modem. Furthermore, the filtering device may prevent noise associated with the digital data signals from unduly interfering with the analog telephone signals used by POTS telephones or the digital telephone signals used by ISDN telephones, while preventing higher frequency interference or noise associated with the telephones from unduly interfering with the digital data signals.

These functions are performed while reducing or eliminating losses in telephone signals that have been characteristic of previous passive filtering devices, particularly losses created when installing more than three to five of these passive filtering devices at a customer premises. Unlike passive filtering devices, a virtually unlimited number of filtering devices constructed according to the present invention may be implemented at a customer premises without creating unacceptable losses. Furthermore, unlike previous passive filtering devices, numerous filtering devices constructed according to the present invention may be implemented without creating interference between the telephone signals (POTS, ISDN, or otherwise) and the digital data signals (which may cause loss of data in the digital data signals). In addition, the present invention provides filtering devices that provide high order filtering without unduly degrading performance. To obtain similar order filtering using passive filtering devices, a relatively large number of cascaded filters are required, resulting in undesirable signal loss and interference. Other technical advantages are readily apparent to those skilled in the art.

BRIEF DESCRIPTION OF THE DRAWINGS

To provide a more complete understanding of the present invention and further features and advantages thereof, reference is now made to the following description taken in conjunction with the accompanying drawings, in which.

DETAILED DESCRIPTION OF THE INVENTION

Figure 1:
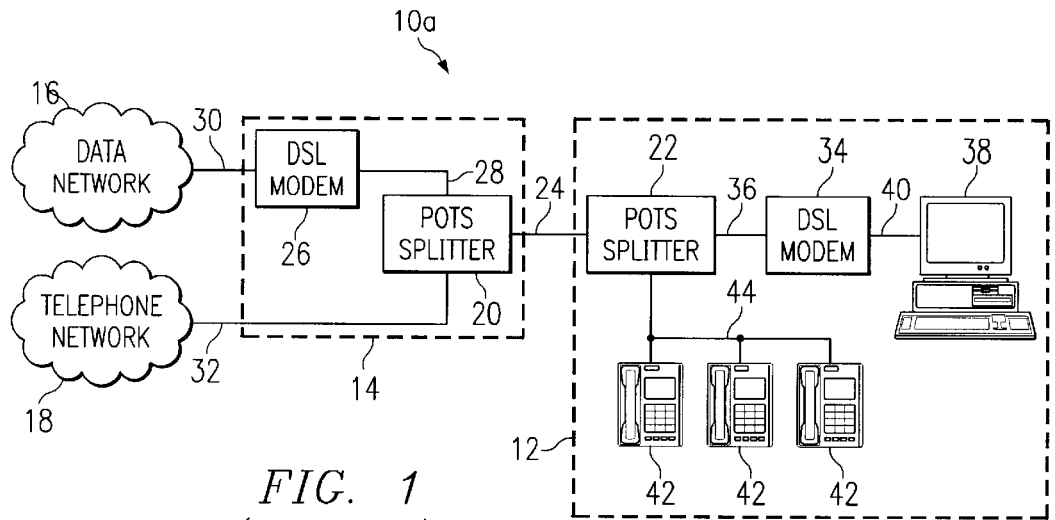
FIG. 1 illustrates an exemplary digital subscriber line (DSL) system using a splitter at a customer premise.

FIG. 1 illustrates an exemplary digital subscriber line (DSL) system 10a. DSL technologies allow existing twisted-pair telephone lines, used for plain old telephone service (POTS), or other types of communication lines to communicate both telephone signals (either analog or digital) and digital data signals between network equipment at a central office and equipment at a customer premises. System 10a may support asymmetric DSL (ADSL), ISDN DSL (IDSL), symmetric DSL (SDSL), high-data-rate DSL (HDSL), rate-adaptive DSL (RADSL), very-high-data-rate DSL (VDSL) or any other suitable "xDSL" technology or other method of transmitting digital data over analog telephone lines, digital ISDN lines, or any other appropriate communication lines.

System 10a includes a customer premises 12, a central office 14, a data network 16, and a telephone network 18. In one embodiment, a pair of splitters 20 and 22 (at central office 14 and customer premises 12, respectively) are used to receive signals transmitted using a twisted-pair or other suitable telephone line 24 from customer premises 12 and central office 14, respectively. Telephone line 24 may also include integrated services digital network (ISDN) lines, unshielded twisted-pair (UTP) lines, or any other appropriate communication lines. The signals generally include, without limitation, a telephone signal in a lower frequency band and a digital data signal in a higher frequency band. In a particular embodiment, the lower frequency band includes a band of frequencies below approximately 4 kHz and the higher frequency band includes a band of frequencies above approximately 25 kHz (the frequency bands typically associated with analog POTS telephone signals and ADSL data signals, respectively). In another embodiment, the lower frequency telephone signals are digital ISDN telephone signals having frequencies below approximately 80 kHz.

At central office 14, splitter 20 receives an input signal communicated from splitter 22 using telephone line 24. As described above, the input signal generally includes a telephone signal in a lower frequency band and a data signal in a higher frequency band. Splitter 20 processes the input signal and separates the data signal from the telephone signal. In one embodiment, splitter 20 communicates the separated data signal to a DSL modem 26 or a modem bank (such as a DSL access multiplexer (DSLAM)) using link 28. DSL modem 26 receives the data signal from splitter 20 and communicates corresponding data to data network 16 using link 30. Data network 16 may include any suitable group of one more linked computers, such as a local area network (LAN), a wide area network (WAN), the Internet, or any other suitable network for communicating data signals. Splitter 20 communicates the telephone signal to telephone network 18 using link 32. Telephone network 18 may include any suitable group of one or more linked telephone switches, such as a public switched telephone network (PSTN), a private switched telephone network, or any other suitable network for communicating telephone signals. Links 28, 30, and 32 may be any suitable wireless, wireline, or other communication links and may each be associated with one or more intermediate components.

Splitter 22 at customer premises 12 receives an input signal communicated from splitter 20 using telephone line 24. Again, the input signal generally includes a telephone signal in a lower frequency band and a data signal in a higher frequency band. Splitter 22 processes the input signal and separates the data signal from the telephone signal. Splitter 22 communicates the separated data signal to a DSL modem 34 using link 36. DSL modem 26 receives the data signal and communicates corresponding data to computer 38 using link 40. Computer 38 may be a personal computer, a workstation, a personal digital assistant, or any other suitable processing or communication device. Although DSL modem 34 is shown as external from computer 38, DSL modem 34 may be integral to or separate from computer 38 according to particular needs. splitter 22 communicates the separated telephone signal to telephones 42 using links 44. Telephones 42 may include one or more POTS telephones, ISDN telephones, facsimile machines, analog voice-band modems, or any other suitable devices. Links 36, 40, and 44 may be any suitable wireless, wireline, or other communication links and may each be associated with one or more intermediate components. In particular, links 44 may include the customer premises telephone wiring.

Figure 2:
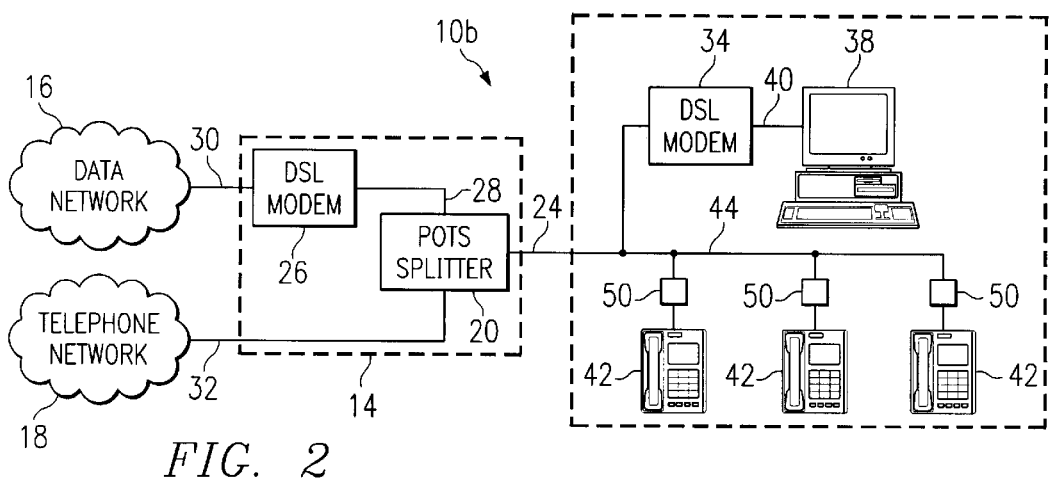
FIG. 2 illustrates an alternative DSL system without a splitter at the customer premises.

FIG. 2 illustrates DSL system 10b using an alternative configuration without splitter 22. Such a configuration may be implemented when splitterless DSL (for example, G.Lite or DSL Lite) is used. In this embodiment, the telephone and data signals are communicated from splitter 20 to DSL modem 34 without passing through a splitter at customer premises 12. DSL modem 34 includes components that differentiate the data signals from the telephone signals. System 10b also includes active filtering devices 50 constructed according to the present invention that are located between each telephone 42 and the links 44 (such as customer premises telephone wiring 44) coupling the telephones 42 to telephone line 24. For example, a filtering device 50 may be located between each telephone 42 and an RJ-11 telephone jack providing an interface to customer premises telephone wiring 44. In one embodiment, filtering devices 50 are wired in parallel to one another.

Filtering devices 50 are implemented so as to allow the lower-frequency telephone signals to pass, but to filter out any higher-frequency data signals. For example, filtering devices 50 may each include a low-pass filter circuit that filters out signals over 4 kHz. Filtering devices 50 help to prevent disruption of telephone service due to faults in the DSL equipment, such as DSL modem 34. Furthermore, filtering devices 50 may prevent noise associated with the data signals from unduly interfering with the operation of telephones 42, while preventing higher frequency interference or noise associated with telephones 42 from unduly interfering with the data signals. Filtering devices 50 may also be used in a similar manner in system 10a to supplement the filtering performed by splitter 22. Filtering devices 50 perform these functions while reducing or eliminating losses and interference associated with previous filtering devices.

Figure 3:
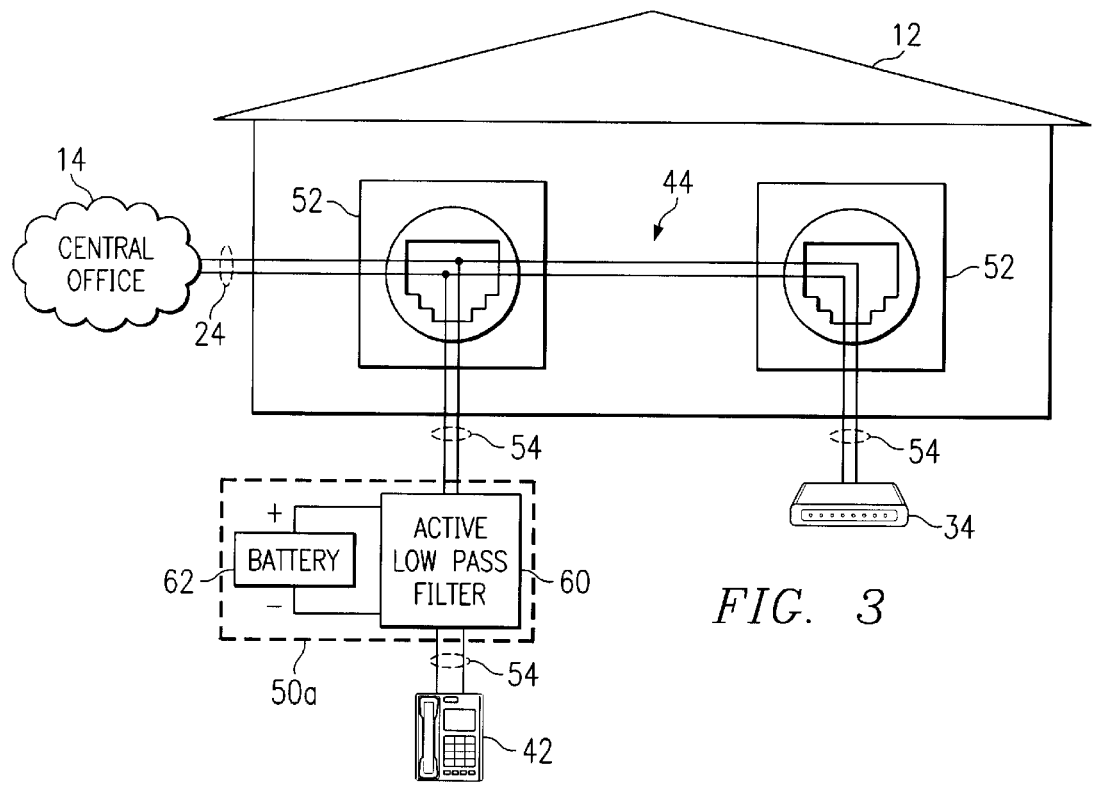
FIG. 3 illustrates an exemplary filtering device at a customer premise.

FIG. 3 illustrates customer premises 12 and an exemplary filtering device 50a in further detail. Although customer premises 12 is illustrated without splitter 22, it should be understood that filtering device 50a may be used as described below either with or without splitter 22. Filtering device 50a is coupled between telephone 42 and an RJ-11 jack 52 or any other appropriate jack used to couple telephone 42 to customer premises telephone wiring 44. Jack 52 typically includes electrical connections to at least four wires, which typically run between multiple jacks 52 in customer premises 12 to form customer premises telephone wiring 44. Two of the wires for which jack 52 includes a connection, wires 54, are coupled to telephone line 24 (which itself includes two corresponding wires). Wires 54, and the two corresponding wires of telephone line 24, are typically referred to as the tip and ring wires and carry the telephone and data signals between central office 14 and telephone 42 or DSL modem 34. The other two wires included in customer premises telephone wiring 44 need not be used in conjunction with the embodiment illustrated in FIG. 3, but will be described in further detail below.

As described above, filtering device 50a is used to filter out higher-frequency data signals and to pass lower-frequency telephone signals. In one embodiment, filtering device 50a performs this function using an active low-pass filter 60 that passes telephone signals below approximately 4 kHz and attenuates data signals above approximately 25 kHz, although any appropriate filtering may be performed. Low-pass filter 60 may filter signals sent to telephone 42 from central office 14 and signals sent from telephone 42 to central office 14. Low-pass filter 60 is an active filter that uses electrical power in its operation and may be constructed according to techniques known to those skilled in the art. Low-pass filter 60 may use any components appropriate for an active low-pass filter including, but not limited to, operational amplifiers, resistors, and capacitors.

Unlike passive low-pass filters presently used for telephone signal filtering, active low-pass filters 60 may be used in customer premises 12 with minimal degradation of the telephone signals. Passive filters use components, such as inductors, that create loss in the telephone signal (such as a reduction in the amplitude of the signal). If customer premises 12 includes numerous telephones 42 and each telephone 42 has a corresponding passive low-pass filter, unacceptable losses may be created. Therefore, certain passive low-pass filter vendors specify that a maximum of three to five filters should be used in a customer premise. In addition, to obtain higher-order filtering and precise attenuation of the data signals, the number of components in a passive low-pass filter must typically be increased. This increased number of components also causes an increased amount of loss associated with each passive filter. Furthermore, numerous passive filters also create interference between the telephone signals and the data signals (which may cause loss of data in the data signals).

The use of active low-pass filter 60 in filtering device 50 reduces or eliminates these losses and interference. For example, low-pass filter 60 may use operational amplifiers that are gained so as to compensate for losses created by other components of filter 60. In addition, active low-pass filter 60 may be used to achieve a relatively high order filter (for example, eighth or higher order filtering) that provides the attenuation of the high frequency signals desired to prevent undue interference with the operation of telephones 42 and DSL modem 34. In addition, multiple active low-pass filters 60 may be connected in parallel to customer premises telephone wiring 44 (one filter 60 coupled to each telephone 42) with minimal losses to the telephone signals sent to and from telephones 42 and with minimal interference between the telephone signals and the data signals.

One advantage of passive filters is that they do not require power to be supplied from an external source. Active low-pass filter 60, however, does use electrical power. Therefore, the present invention includes appropriate techniques for supplying power to low-pass filter 60. In the embodiment illustrated in FIG. 3, filtering device 50a includes one or more batteries 62 that supply power to low-pass filter 60. Any appropriate type and number of batteries 62 may be used to meet the power requirements of low-pass filter 60, and batteries 62 may be coupled to low-pass filter 60 in any appropriate manner. Furthermore, batteries 62 may be configured to operate only when the associated telephone 42 is operating, so that battery power may be conserved. Batteries 62 may also include rechargeable batteries that may be recharged periodically using the electrical service provided at customer premises 12 or any other appropriate power source.

Figure 4:
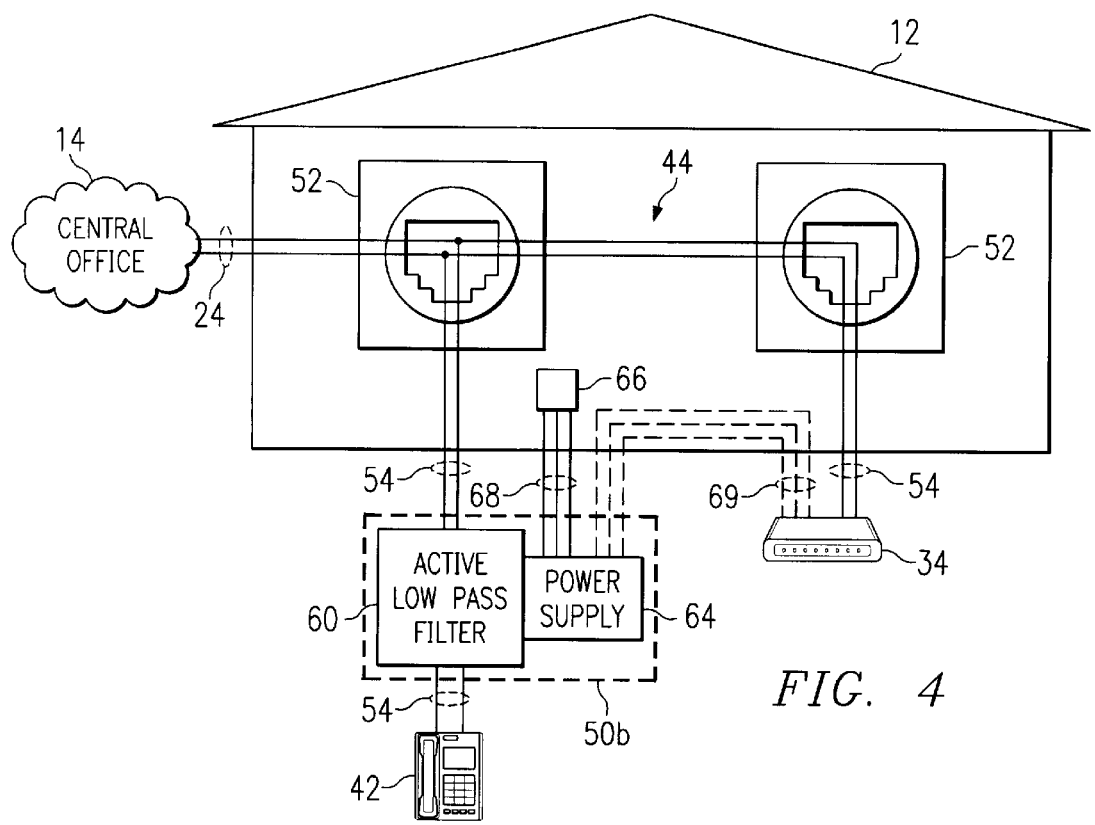
FIG. 4 illustrates an alternative filtering device using an external power supply.

FIG. 4 illustrates an alternative filtering device 50b using a power supply 64. Power supply 64 may be coupled to an electrical outlet 66 or other external source of power using wires 68. Wires 68 may include a positive supply wire, a negative supply wire, and a ground wire. Electrical outlet 66 may include, but is not limited to, an existing outlet that is a part of the electrical wiring of customer premises 12, and power supply 64 may include, but is not limited to, one or more transformers that may step down the typical 120V alternating current supplied by electrical outlet 66. Alternatively, additional electrical wiring may be installed at customer premises 12 to provide electrical current to power supply 64 or directly to low-pass filter 60. This wiring may include, but is not limited to, wiring 69 coupled to DSL modem 34 or other appropriate DSL customer premises equipment (CPE) so as to allow the DSL CPE to provide power to filtering device 50b. Although wiring 69 is illustrated as being coupled to power supply 64, wiring may be directly coupled to active low-pass filter 60, if appropriate.

Figure 5:
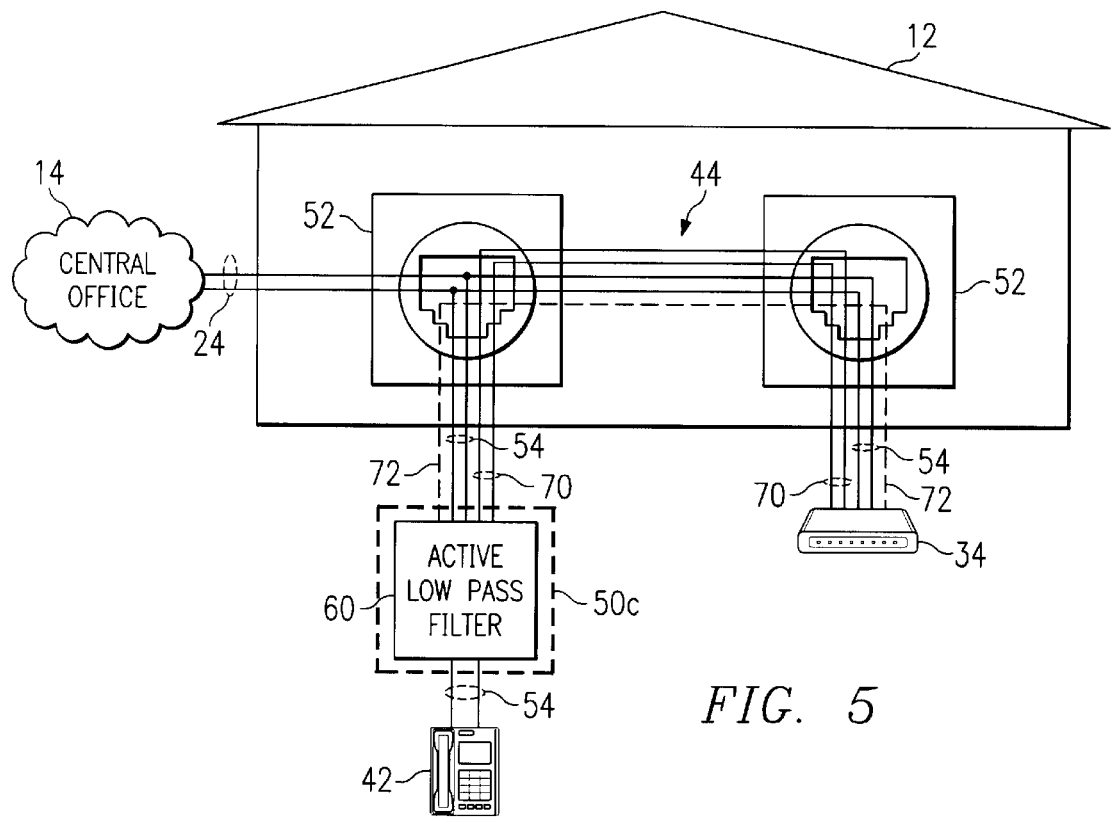
FIG. 5 illustrates another alternative filtering device using the customer premises telephone wiring to obtain electrical power.

FIG. 5 illustrates another alternative filtering device 50c using customer premises telephone wiring 44 to obtain electrical power. As described above, telephone wiring 44 typically includes four wires to which a connection is provided at jacks 52. Two of these wires are tip and ring wires 54 used to communicate the telephone and data signals to and from central office 14. The other two wires 70 may be used to provide electrical power to one or more operational amplifiers or other appropriate components that are included in active low-pass filter 60. Pump operational amplifiers may be implemented that use a positive power supply to create a negative power supply, so that only two wires are connected to the operational amplifier: a positive supply wire and a ground wire. Therefore, one of wires 70 may be used as a positive supply wire and the other wire may be used as a ground wire.

In the illustrated embodiment, DSL modem 34 or any other DSL CPE may include one or more components that provide electrical power as described above to one or more operational amplifiers or other components in filtering device 50c using wires 70. Since wires 70 are typically included in customer premises telephone wiring 44, no additional wiring is typically required to provide this power from the DSL CPE. In addition, any other device coupled to customer premises telephone wiring 44 may provide this power to filtering device 50c. Furthermore, an RJ-11 jack typically has connections for six wires, although only four wires are used in a typical customer premises telephone wiring 44. However, if telephone wiring 44 includes at least one additional wire 72, wire 72 could be used along with wires 70 to provide the three-wire electrical power supply described above with reference to FIG. 4. In this case, power could be supplied to filtering device 50c using a positive supply wire, a negative supply wire, and a ground wire without the use of additional wiring 68 (described above with reference to FIG. 4) coupling filtering device 50c to an electrical power source. For example, wires 70 and 72 may be coupled to a DSL CPE in a similar manner as described above to provide power to filtering device 50c using customer premises telephone wiring 44.

Figure 6:
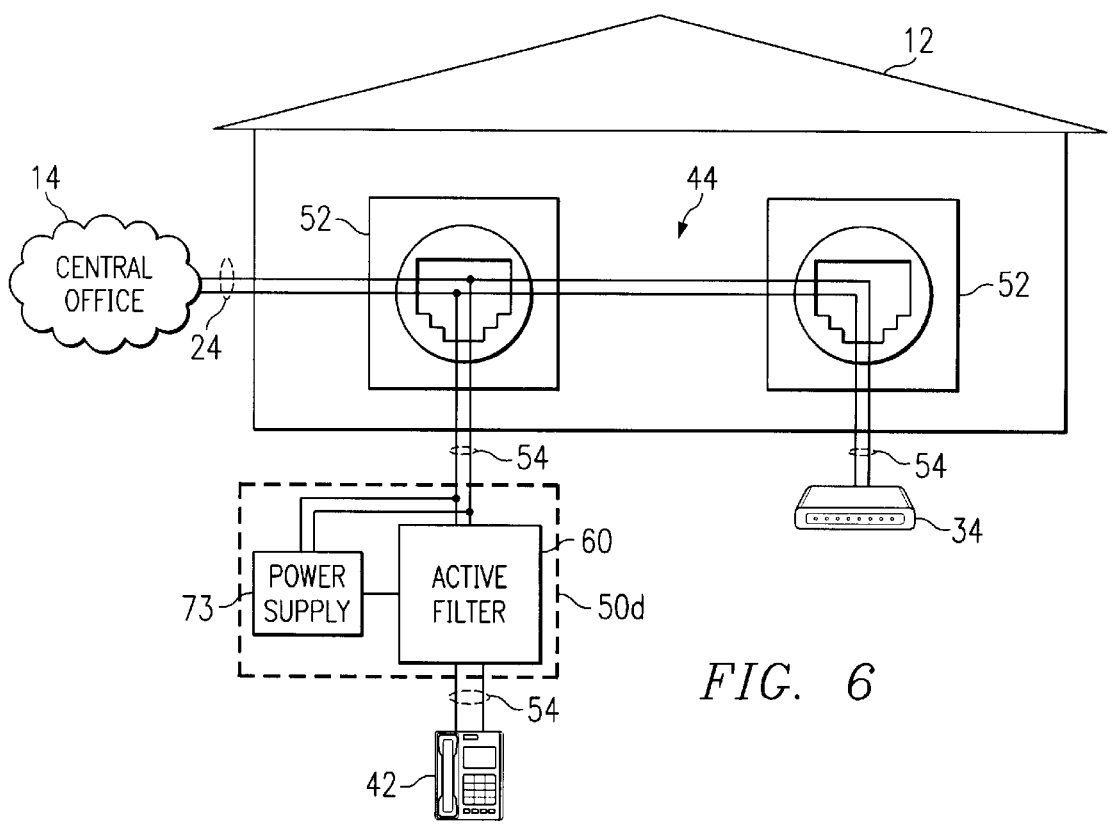
FIG. 6 illustrates yet another alternative filtering device using the current from the telephone line to obtain electrical power.

FIG. 6 illustrates yet another alternative filtering device 50d using a current supplied on telephone line 24 to obtain electrical power. In conjunction with the operation of telephones 42, a current may be supplied over telephone line 24 by central office 14 or any other appropriate source. For example, central office 14 may provide a current of approximately 60–70 mA over telephone line 24 when a telephone 42 goes off-hook. This current may be referred to as a loop current. Filtering device 50d includes a power supply 73 that transforms the loop current to create a voltage appropriate for active low-pass filter 60.

Figure 7:
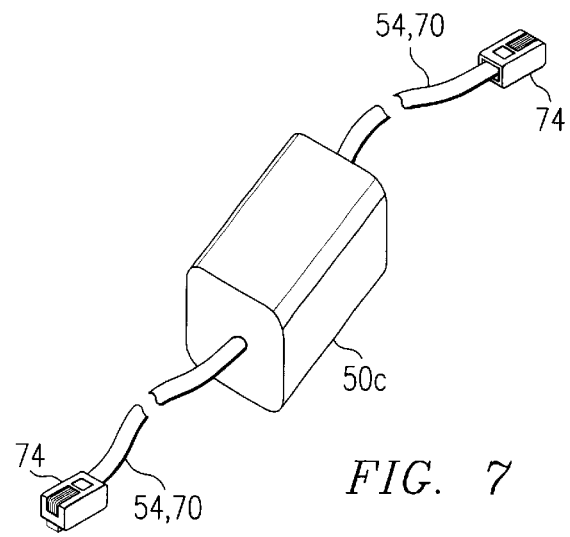
FIG. 7 illustrates exemplary packaging of the filtering device of FIG. 5.

FIG. 7 illustrates exemplary packaging of filtering device 50c. Since filtering device 50c does not require a battery or external power supply, filtering device 50c may be contained in a relatively small package. In addition, a set of wires 54 and 70 (and optionally wire 72) may be coupled to an input and an output of filtering device 50c, and each set of wires 54 and 70 may be terminated with an RJ-11 plug 74 or other appropriate connector for facilitating connection of filtering device 50c between customer premises telephone wiring 44 and telephone 42. The combination of filtering device 50c, wires 54 and 70, and plugs 74 may be referred to as a dungle. Alternatively, filtering device 50c may include an RJ-11 jack in place of each set of wires 54 and 70 and plug 74 to allow a user to provide wires 54 and 70 having a length selected by the user. Wires 54 and 70 provided by the user would be terminated with a plug 74 for insertion into one of the jacks associated with filtering device 50c. In either case, filtering device 50c includes RJ-11 input and output interfaces (either a plug or a jack) that facilitate the coupling of filtering device 50c to wires 54 and 70.

Filtering devices 50a, 50b, and 50d may also be implemented as illustrated in FIG. 7 with the addition of either a battery 62, an electrical power supply 64 and accompanying wires 68, or a power supply 73, respectively. Battery 62 or a power supply 64 or 73 may be coupled to an electrical interface providing power to the appropriate component(s) of active low-pass filter 60. Furthermore, filters 50a–50d may be implemented in any other appropriate manner, including incorporation into a telephone 42, a splitter 22 (if applicable), or a DSL router coupled between central office 14 and telephones 42.

Although the present invention has been described with several embodiments, numerous changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A filtering device for active filtering at a customer premises, comprising:
    an input interface operable to receive telephone signals and digital data signals communicated from a central office using a telephone line;
    an active low-pass filter operable to receive the telephone signals and the digital data signals from the input interface, and to receive electrical power from one or more components of digital subscriber line (DSL) customer premises equipment (CPE), the active low-pass filter further operable to attenuate the digital data signals and pass the telephone signals using the electrical power; and
    an output interface operable to receive the telephone signals from the active low-pass filter and communicate the telephone signals to a telephone;
    wherein the input interface comprises an RJ-11 interface including electrical connections for a first tip wire, a first ring wire, and for at least two additional wires operable to provide electrical power from the one or more components of the DSL CPE to the active low-pass filter via the RJ-11 interface.

2. The filtering device of claim 1, wherein:
    the telephone signals comprise analog signals having a frequency below approximately 4 kHz; and
    the digital data signals comprise DSL signals having a frequency above approximately 25 kHz.

3. The filtering device of claim 1, wherein:
    the RJ-11 interface is coupled to customer premises telephone wiring comprising:
        the first tip wire and the first ring wire; and
        the at least two additional wires; and
    the RJ-11 interface is operable to receive the electrical power from the one or more components of the DSL CPE using the customer premises telephone wiring.

4. The filtering device of claim 1 wherein:
    the active low-pass filter comprises an operational amplifier; and
    the at least two additional wires operable to provide electrical power comprise a positive supply wire and a ground wire electrically coupled to the operational amplifier.

5. The filtering device of claim 1, wherein the input interface comprises:
    a telephone line interface comprising the electrical connections for the first tip wire and the first ring wire; and
    an electrical power interface comprising the electrical connections for the at least two additional wires.

6. The filtering device of claim 5, wherein:
    the telephone line interface is coupled to customer premises telephone wiring comprising the first tip wire and the first ring wire, the first tip and first ring wires coupled to the telephone line; and
    the electrical power interface is electrically coupled to the one or more components of DSL CPE operable to provide electrical power.

7. The filtering device of claim 5, wherein:
    the active low-pass filter comprises an operational amplifier; and
    the electrical power interface is coupled to the operational amplifier.

8. The filtering device of claim 1, wherein the output interface comprises an RJ-11 interface including electrical connections for a second tip wire and a second ring wire for coupling the output interface to the telephone.

9. The filtering device of claim 8, wherein:
    the output interface is operable to receive output signals from the telephone comprising telephone signals and noise signals having a frequency higher than the frequency of the telephone signals, the output interface further operable to communicate the output signals to the active low-pass filter; and
    the active low-pass filter is operable to receive the output signals from the output interface and the electrical power from the input interface, the active low-pass filter further operable to attenuate the noise signals and pass the telephone signals using the electrical power.

10. The filtering device of claim 9, wherein the input interface is operable to receive the telephone signals from the active low-pass filter and communicate the telephone signals to the telephone line.

11. A method for active filtering at a customer premises, comprising:
    at an input interface, receiving telephone signals and digital data signals communicated from a central office using a telephone line;
    communicating the telephone signals and digital data signals from the input interface to an active low-pass filter;
    at the active low-pass filter, receiving the telephone signals and digital data signals from the input interface and receiving electrical power from one or more components of digital subscriber line (DSL) customer premises equipment (CPE);

using the active low-pass filter, attenuating the digital data signals and passing the telephone signals using the electrical power; and communicating the telephone signals from the active low-pass filter to an output interface coupled to a telephone;

wherein the input interface comprises an RJ-11 interface including electrical connections for a tip wire, a ring wire, and for at least two additional wires operable to provide electrical power from the one or more components of the DSL CPE to the active low-pass filter via the RJ-11 interface.

12. The method of claim 11, wherein:

the telephone signals comprise analog signals having a frequency below approximately 4 kHz; and the digital data signals comprise DSL signals having a frequency above approximately 25 kHz.

13. The method of claim 11, wherein:

the RJ-11 interface is coupled to customer premises telephone wiring including the tip wire, the ring wire, and the at least two additional wires; and the RJ-11 interface receives electrical power from the one or more components of the DSL CPE using the customer premises telephone wiring.

14. The method of claim 11, wherein receiving telephone signals and digital data signals at the input interface comprises receiving the signals using customer premises telephone wiring comprising the tip line and the ring line coupled to the telephone line.

15. The method of claim 11, further comprising:

at the output interface, receiving output signals from the telephone comprising telephone signals and noise signals having a frequency higher than the frequency of the telephone signals;

communicating the output signals to the active low-pass filter; and using the active low-pass filter, attenuating the noise signals and passing the telephone signals using the electrical power.

16. The method of claim 15, further comprising communicating the telephone signals to the telephone line.

17. A filtering device for active filtering at a customer premises, comprising:

a first interface means for receiving telephone signals and digital data signals communicated from a central office using a telephone line;

a filter means for receiving the telephone signals and the digital data signals from the first interface, and for receiving electrical power from one or more components of digital subscriber line (DSL) customer premises equipment (CPE) and for attenuating the digital data signals and passing the telephone signals using the electrical power; and a second interface means for receiving the telephone signals from the filter means and for communicating the telephone signals to a telephone;

wherein the first interface means comprises an RJ-11 interface including electrical connections for a first tip wire, a first ring wire, and for at least two additional wires operable to provide electrical power from the one or more components of the DSL CPE to the active low-pass filter via the RJ-11 interface.

18. The filtering device of claim 17, wherein:

the telephone signals comprise analog signals having a frequency below approximately 4 kHz; and the digital data signals comprise DSL signals having a frequency above approximately 25 kHz.

19. The filtering device of claim 17, wherein:

the RJ-11 interface is coupled to customer premises telephone wiring comprising:

the first tip wire and the first ring wire; and the at least two additional wires; and the RJ-11 interface is operable to receive the electrical power from the one or more components of the DSL CPE using the customer premises telephone wiring.

20. The filtering device of claim 17, wherein:

the filter means comprises an operational amplifier; and the at least two additional wires operable to provide electrical power comprise a positive supply wire and a ground wire electrically coupled to the operational amplifier.

21. The filtering device of claim 17, wherein the first interface means comprises:

a telephone line interface comprising the electrical connections for the first tip wire and the first ring wire; and an electrical power interface comprising the electrical connections for the at least two additional wires.

22. The filtering device of claim 21, wherein:

the telephone line interface is coupled to customer premises telephone wiring comprising the first tip wire and the first ring wire, the first tip and first ring wires coupled to the telephone line; and the electrical power interface is electrically coupled to the one or more components of DSL CPE operable to provide electrical power.

23. The filtering device of claim 21, wherein:

the filter means comprises an operational amplifier; and the electrical power interface is coupled to the operational amplifier.

24. The filtering device of claim 17, wherein the second interface means comprises an RJ-11 interface including electrical connections for a second tip wire and a second ring wire for coupling the output interface to the telephone.

25. The filtering device of claim 24, wherein:

the second interface means is operable to receive output signals from the telephone comprising telephone signals and noise signals having a frequency higher than the frequency of the telephone signals, the second interface means further operable to communicate the output signals to the filter means; and the filter means is operable to receive the output signals from the second interface means and the electrical power from the first interface means, the filter means further operable to attenuate the noise signals and pass the telephone signals using the electrical power.

26. The filtering device of claim 25, wherein the first interface means is operable to receive the telephone signals from the filter means and communicate the telephone signals to the telephone line.

\* \* \* \* \*